(12) United States Patent
Suzuki et al.

(10) Patent No.: US 12,062,931 B2
(45) Date of Patent: Aug. 13, 2024

(54) CHARGE PROTECTION CIRCUIT, CHARGER, ELECTRONIC DEVICE, AND CHARGE PROTECTION METHOD

(71) Applicant: CASIO COMPUTER CO., LTD., Tokyo (JP)

(72) Inventors: Hideo Suzuki, Ome (JP); Masanori Ishihara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 210 days.

(21) Appl. No.: 17/539,817

(22) Filed: Dec. 1, 2021

(65) Prior Publication Data

US 2022/0094180 A1     Mar. 24, 2022

Related U.S. Application Data

(63) Continuation of application No. 16/558,672, filed on Sep. 3, 2019, now Pat. No. 11,218,015.

(30) Foreign Application Priority Data

Sep. 18, 2018    (JP) ................................ 2018-173251

(51) Int. Cl.
*H02J 7/00* (2006.01)

(52) U.S. Cl.
CPC ...... *H02J 7/00308* (2020.01); *H02J 7/00302* (2020.01); *H02J 7/00304* (2020.01); *H02J 7/00309* (2020.01)

(58) Field of Classification Search
USPC ........................................................ 320/163
See application file for complete search history.

(56) References Cited

U.S. PATENT DOCUMENTS 6,239,581 B1    5/2001 Yoshida
6,992,463 B2 *  1/2006 Yoshio ..................... H02H 3/05
                                                    320/136
(Continued)

FOREIGN PATENT DOCUMENTS

CN    102163839 A    8/2011
CN    103746417 A    4/2014
(Continued)

OTHER PUBLICATIONS

Notice of Reasons for Refusal dated Aug. 18, 2020 received in Japanese Patent Application No. JP 2018-173251 together with an English language translation.
(Continued)

*Primary Examiner* — Samuel Berhanu
(74) *Attorney, Agent, or Firm* — Scully, Scott, Murphy & Presser, P.C.

(57) ABSTRACT

Disclosed is a charge protection circuit including: a switch that switches between allowing and not allowing power supply from an external power source to a charging circuit that supplies power for charging a rechargeable battery; a detector that detects at least one of a current flowing from the charging circuit to the rechargeable battery and a voltage between two electrodes of the rechargeable battery; a determiner that determines whether a detection result of the detector is abnormal; and a controller that, in response to the determiner determining that the detection result of the detector is abnormal, causes the switch to switch to an interrupting state so as to interrupt power supply to the charging circuit.

17 Claims, 4 Drawing Sheets

(56) References Cited

U.S. PATENT DOCUMENTS

| | | |
|---|---|---|
| 8,174,237 B2 | 5/2012 | Kosugi et al. |
| 8,558,515 B2 | 10/2013 | Baba et al. |
| 8,610,405 B2 | 12/2013 | Yamazaki et al. |
| 8,796,996 B2 | 8/2014 | Nakatsuji et al. |
| 2009/0051324 A1 | 2/2009 | Nakatsuji |
| 2010/0007310 A1 | 1/2010 | Kawamoto et al. |
| 2011/0140664 A1* | 6/2011 | Aradachi ............ H01M 10/441 320/116 |
| 2011/0241628 A1 | 10/2011 | Chen |
| 2011/0267009 A1* | 11/2011 | Nakatsuji ............ H01M 10/48 320/152 |
| 2013/0181681 A1 | 7/2013 | Mukai et al. |
| 2016/0201634 A1 | 7/2016 | Kim et al. |
| 2020/0395779 A1* | 12/2020 | Nam ............ H01M 10/425 |

FOREIGN PATENT DOCUMENTS

| | | |
|---|---|---|
| JP | H09-56056 A | 2/1997 |
| JP | 2001-028838 A | 1/2001 |
| JP | 2007-336698 A | 12/2007 |
| JP | 2011-004509 A | 1/2011 |
| JP | 2011-176940 A | 9/2011 |
| JP | 2011004509 A | 12/2021 |
| WO | 2007/007655 A1 | 1/2007 |

OTHER PUBLICATIONS

Office Action dated Apr. 15, 2021 received in U.S. Appl. No. 16/558,672.
Notice of Allowance dated Sep. 1, 2021 received in U.S. Appl. No. 16/558,672.
Second Notification of Review Comments dated May 19, 2023 received in Chinese Patent Application No. CN 201910875746.X.
First Office Action dated Dec. 30, 2022 received in Chinese Patent Application No. CN 201910875746.X.

\* cited by examiner

US 12,062,931 B2

CHARGE PROTECTION CIRCUIT, CHARGER, ELECTRONIC DEVICE, AND CHARGE PROTECTION METHOD

CROSS-REFERENCE TO RELATED APPLICATIONS

This application is a continuation application of U.S. patent application Ser. No. 16/558,672 filed on Sep. 3, 2019 which is based upon and claims the benefit of priority under 35 U.S.C. 119 of Japanese Patent Application No. 2018-173251 filed on Sep. 18, 2018 the entire disclosure of which, including the description, claims, drawings, and abstract, is incorporated herein by reference in its entirety.

BACKGROUND

The technical field relates to a charge protection circuit, a charger, an electronic device, and a charge protection method.

A charger that charges a rechargeable battery has various types of safety mechanisms in a charging circuit that prevent abnormal power output to the rechargeable battery in order to prevent troubles such as overheating due to overcharging of the rechargeable battery and a short-circuit current and to charge the battery at a stable voltage. For example, Japanese Patent Application Publication No. 2001-28838 (JP 2001-28838 A) discloses a charger that prevents erroneous charging by interrupting the voltage supply from an AC adapter when the voltage supplied from the AC adapter is abnormal.

However, the charger disclosed in JP 2001-28838 A may fail to appropriately respond to an abnormal operation of a charging circuit itself.

SUMMARY

One of the aspects is a charge protection circuit including: a switch that switches between allowing and not allowing power supply from an external power source to a charging circuit that supplies power for charging a rechargeable battery; a detector that detects at least one of a current flowing from the charging circuit to the rechargeable battery and a voltage between two electrodes of the rechargeable battery; a determiner that determines whether a detection result of the detector is abnormal; and a controller that, in response to the determiner determining that the detection result of the detector is abnormal, causes the switch to switch to an interrupting state so as to interrupt power supply to the charging circuit.

DESCRIPTION OF THE EMBODIMENTS

Hereinafter, exemplary embodiments will be described with reference to the accompanying drawings.

Figure 1:
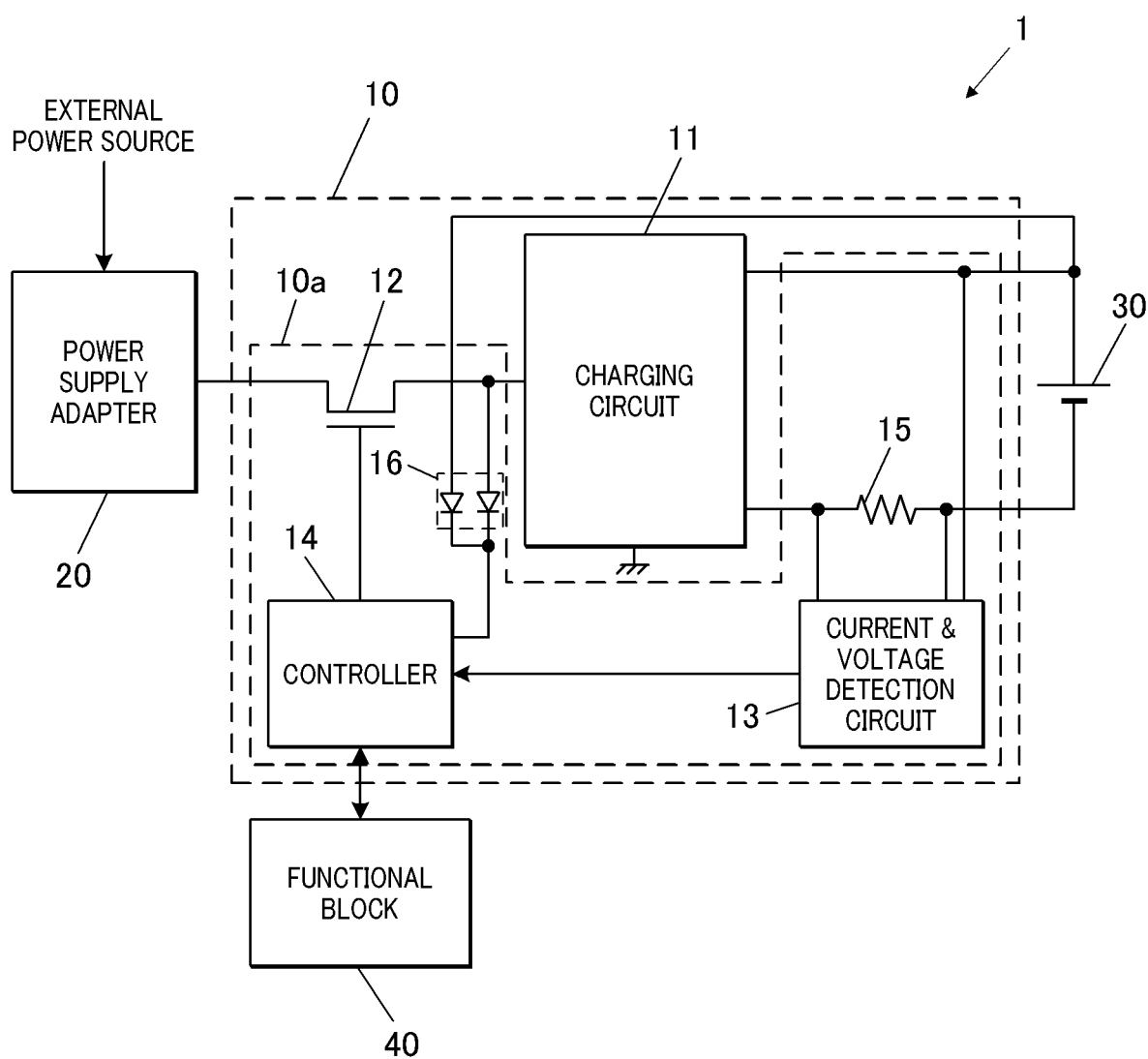
FIG. 1 is a block diagram illustrating the functional configuration of an electronic device.

FIG. 1 is a block diagram illustrating the functional configuration of an electronic device 1 according to the present embodiment.

The electronic device 1 includes a charger 10, a power supply adapter 20, a rechargeable battery 30, and a functional block 40.

The charger 10 receives power supplied from an external power source, and outputs power to the rechargeable battery 30 to charge the rechargeable battery 30.

The power supply adapter 20 converts (A-D converts) the power input from an external power source (commercial AC power source in the present embodiment) into a predetermined DC voltage, and supplies the DC voltage to the charger 10. The power supply adapter 20 includes, for example, a plug for an outlet of the commercial power source, and automatically starts input and output of power when the plug is inserted into the outlet.

The rechargeable battery 30 supplies power required for operations of the functional block 40. The rechargeable battery 30 is a rechargeable battery, such as a lithium-ion battery, capable of outputting stored power. The rechargeable battery 30 may be detachable from the charger 10, or may be independent from charger 10 the and replaceable. Alternatively, the rechargeable battery 30 may be an integral unit of the charger 10.

The functional block 40 implements operations of the electronic device 1. The functional block 40 may include, but not specifically limited to, a display and an operation interface, for example. Specifically, the functional block 40 may include a liquid crystal display and a touch sensor overlaid thereon so as to perform display operations and detect user inputs from the outside. The functional block 40 may further include sensors that measure physical quantities such as temperature, acceleration, and magnetic field, and an output unit that outputs sound and/or vibration. The functional block 40 may be powered by the rechargeable battery 30 directly through a cable (not illustrated).

The following describes the charger 10 in more detail.

The charger 10 includes a charging circuit 11, a switching element 12 (switch), a current & voltage detection circuit 13 (detector), a controller 14, a resistive element 15, and a diode 16.

Based on the power input from the external power source through the power supply adapter 20, the charging circuit 11 outputs a current for charging the rechargeable battery 30 so as to supply power to be stored in the rechargeable battery 30. The charging circuit 11 can appropriately convert the input DC power (current and voltage), and output the converted power. The charging circuit 11 outputs a predetermined current, or a current at the substantially rated voltage of the rechargeable battery 30, to the rechargeable battery 30, based on the amount of power stored in the rechargeable battery 30. When the voltage between two electrodes (referred to as a storage voltage) of the rechargeable battery 30 is close to the rated voltage, the charging circuit 11 outputs a current at the substantially rated voltage. Thus, when the storage voltage becomes equal to the rated voltage, the output current becomes zero. Further, the charging circuit 11 includes a known overcharge prevention circuit so as not to charge the rechargeable battery 30 to a predetermined upper limit or greater. Thus, when the storage voltage of the rechargeable battery 30 reaches the upper limit, the charging circuit 11 stops the current output. After stopping the current output, the charging circuit 11 does not restart the charging operation until the storage voltage falls below a predetermined reference value, which is lower than the upper limit.

The switching element 12 switches between whether to allow the power supplied to the charger 10 to be input to the charging circuit 11. The switching element 12, which is, for example, an analog switch in the present embodiment, can reversibly switch between allowing and not allowing power supply to the charging circuit 11 in accordance with a control signal from the controller 14. The switching element 12 is a normally-ON element, and allows power supply when in a basic state such as when a control signal from the controller 14 is not input, or when input of a control signal is started (or restarted).

The current & voltage detection circuit 13 detects an output current flowing from the charging circuit 11 to the rechargeable battery 30 and a voltage applied to the rechargeable battery 30, that is, the level of current flowing to the rechargeable battery 30 and the level of voltage between two electrodes of the rechargeable battery 30 (which is equal to a voltage applied by the charging circuit 11 to the rechargeable battery 30), and outputs signals indicating the detection results to the controller 14 (detecting step). The current & voltage detection circuit 13 may determine whether the current and the voltage are greater than their reference values, and output the detection results in the form of binary signals. Alternatively, the current & voltage detection circuit 13 may obtain (measure) the current value and the voltage value, and output the obtained values themselves to the controller 14. Then, the controller 14 may compare these values to their reference values. The current & voltage detection circuit 13 outputs the detection results at predetermined monitoring intervals (first detection intervals) of, for example, 1 to 10 seconds. The voltage detection by the current & voltage detection circuit 13 may be utilized not only for detecting the charge (power storage) status during charging, but also for detecting the remaining amount of stored power during discharge of the rechargeable battery 30. The monitoring interval (second detection interval) used when charging is not performed may be longer than the first monitoring interval used when charging is performed, and may be, for example, 1 to 10 minutes in the present embodiment. In this case, the controller 14 determines whether power is supplied from the external power source to the charging circuit 11 through the power supply adapter 20. The controller 14 serves as a detection interval setter to set the monitoring interval to 1 to 10 seconds (first detection interval) when power is supplied to the charging circuit 11, and set the monitoring interval to 1 to 10 minutes (second detection interval) when power is not supplied to the charging circuit 11 (when charging is not performed). A determination as to whether power is supplied from the power supply adapter 20 to the charging circuit 11 may be made based on the current input from the input terminal side of the charging circuit 11 to the controller 14 through the diode 16. Alternatively, a current detection circuit may be separately provided upstream of the charging circuit 11 such that the controller 14 obtains the detection result, or a circuit that detects whether power is supplied may be provided in the charging circuit 11 such that the controller 14 obtains the detection result.

Further, as will be described below, when the controller 14 detects an abnormality based on the detection result of the current & voltage detection circuit 13 and switches the switching element 12 to the OFF state (state in which power supply is interrupted), the monitoring interval may be set back to 1 to 10 minutes.

The controller 14 determines whether an abnormality is detected based on the detection result of the current & voltage detection circuit 13, and controls switching of the switching element 12 between the two states (that is, switching between allowing and not allowing power supply) in accordance with the detection result. As described above, the controller 14 can switch the switching element 12 to either the ON state (state in which power supply is allowed) or the OFF state (state in which power supply is interrupted). When the detection result indicates that the current or voltage is equal to or greater than its reference value, the controller 14 determines that an abnormality is detected and switches the switching element 12 to the OFF state to interrupt power supply. Whereas, when both the current and voltage are less than their reference values, the controller 14 switches the switching element 12 to the ON state. The controller 14, which includes a central processing unit (CPU) and a random access memory (RAM), operates with power supplied from the power supply adapter 20 or the rechargeable battery 30 through the diode 16. Further, the controller 14 outputs a control signal to the functional block 40 of the electronic device 1 to control the operations. Even when the functional block 40 of the electronic device 1 is not operating, the controller 14 may become continuously or intermittently active so as to continuously charge and monitor the rechargeable battery 30. Alternatively, a controller that controls operations of the functional block 40 may be provided separately from the controller 14.

Among the elements described above, at least the switching element 12, the current & voltage detection circuit 13, and the controller 14 form a charge protection circuit 10*a* of the charger 10.

The following describes how the controller 14 controls the switching operation of the switching element 12.

Figure 2A:
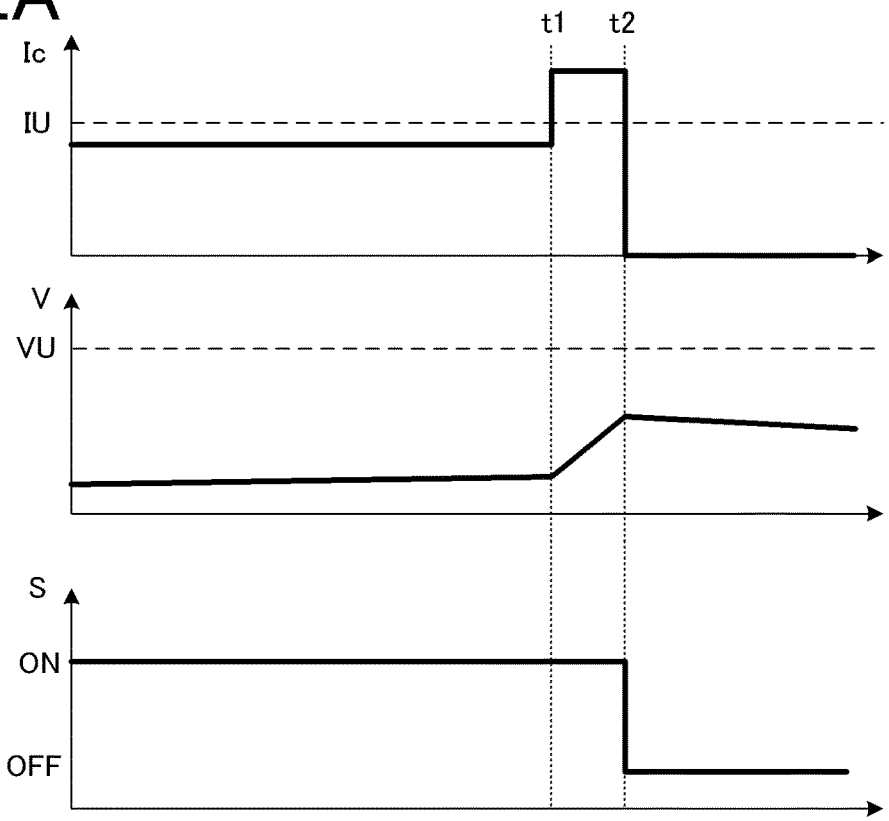
FIG. 2A illustrates the corresponding relationship between the power output from a charging circuit and the control operation.
Figure 2B:
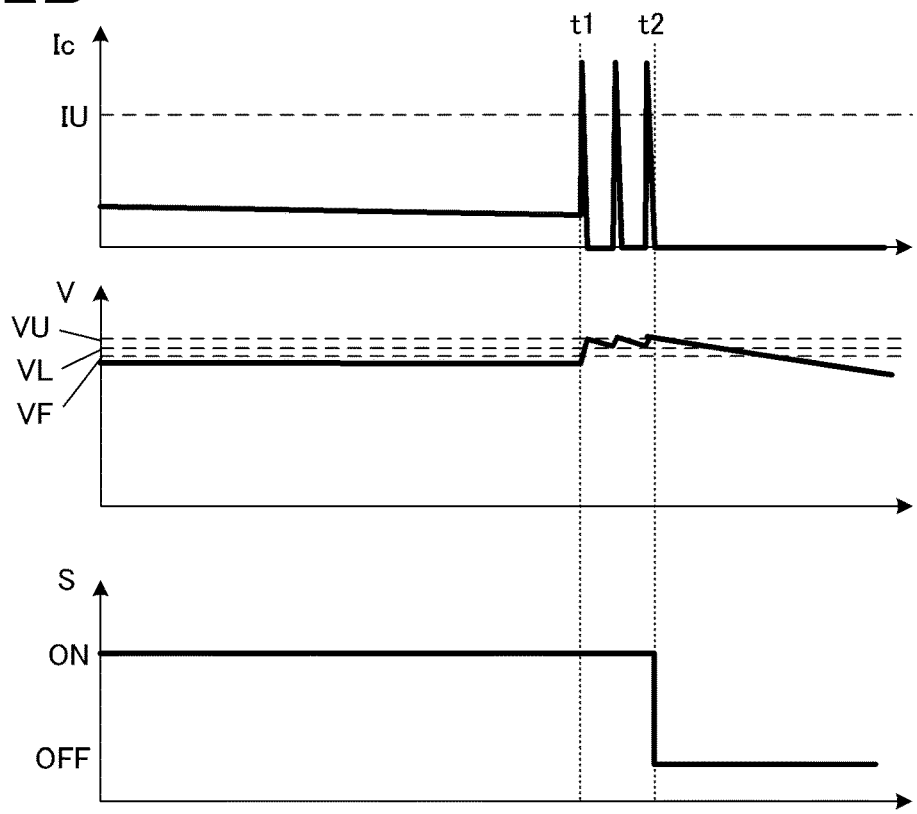
FIG. 2B illustrates the corresponding relationship between the power output from the charging circuit and the control operation.

FIGS. 2A and 2B illustrate the corresponding relationship between the power output from the charging circuit 11 and the control operation. Note that the changes in current and voltage, in particular, the relationship between their rising rate and falling rate illustrated in FIGS. 2A an 2B are merely an example, and do not necessarily represent actual values.

For example, the charging circuit 11 outputs the charging power at a constant current when the stored voltage of the rechargeable battery 30 is low, and at a substantially constant voltage after the storage voltage becomes equal to or greater than a predetermined voltage. In the charging at the substantially constant voltage, the current gradually decreases as the storage voltage approaches the constant voltage, and eventually the charging current becomes substantially zero when the charging ends.

As illustrated in FIG. 2A, in the case where a storage voltage V is sufficiently lower than an upper limit VU, when the internal voltage exceeds the original set voltage or a short circuit occurs due to an abnormality of the charging circuit 11 while outputting power for charging, an output current Ic increases (timing t1). Then, the rising rate of the storage voltage V becomes continuously high, and the current exceeding the upper limit IU is detected at the timing of monitoring by the current & voltage detection circuit 13 (timing t2). Upon detecting the output current greater than the upper limit IU (reference current value), the controller 14 switches a control signal S of the switching element 12 from ON to OFF. Then, the switching element 12 interrupts power supply, so that power is not supplied to the charging circuit 11. Accordingly, the output current Ic from the charging circuit 11 becomes zero.

As illustrated in FIG. 2B, in the case where the storage voltage V is high, when the output current Ic of the charging circuit 11 increases (timing t1), the storage voltage V quickly reaches the upper limit VU. Thus, the overcharge prevention circuit of the charging circuit 11 operates to turn OFF the control signal S, so that the current output is stopped. After the output current Ic becomes "0", the storage voltage V gradually decreases due to consumption of power by the controller 14 and other elements. When the storage voltage V falls below the reference value VL, the current output is restarted. However, the storage voltage V quickly rises again due to the abnormality, so that the current output is stopped. That is, the output current Ic exhibits pulsed fluctuations at short intervals, and the storage voltage V of the rechargeable battery 30 exhibits sawtooth fluctuations at the same intervals.

As described above, the current & voltage detection circuit 13 obtains and outputs the detection results at predetermined monitoring intervals. Therefore, if the output pulse width of the output current Ic is small, it may take time until an abnormal current is detected due to the lack of coincidence with the timing of monitoring. In the present embodiment, since a monitoring reference value VF (reference voltage) is lower than the upper limit VU and the reference value VL of the overcharge prevention circuit (but higher than a set voltage for normal charging at the substantially constant voltage), the storage voltage V remains above the monitoring reference value VF when the output of the charging circuit 11 is abnormal. Thus, the abnormality is reliably detected. Upon detecting a voltage greater than the monitoring reference value VF, the controller 14 switches the switching element 12 to interrupt power supply (timing t2).

In the charge protection circuit 10a, the controller 14 causes the switching element 12 to switch between allowing and not allowing power supply. Therefore, after power supply from the power supply adapter 20 is interrupted, power supply from the rechargeable battery 30 to the controller 14 needs to be maintained for a sufficient time period. Therefore, when causing the switching element 12 to interrupt power supply, the controller 14 restricts operations other than operations for controlling switching of the switching element 12, that is, the operations of the functional block 40, thereby reducing the power consumption by the functional block 40. For example, as for the display of the functional block 40 that provides a visual notification of an abnormality of the charger 10 (charging circuit 11), the controller 14 may set an upper limit for the luminance of the visual notification. Further, the controller 14 may prevent activation of application programs other the control programs for the basic operations of the controller 14, and prompt the user to end the running application program. Meanwhile, the controller 14 does not have to restrict some of the operations of the functional block 40, for example, operations performed as the operation interface, that is, detection of user inputs and output of detection signals to the controller 14.

Figure 3:
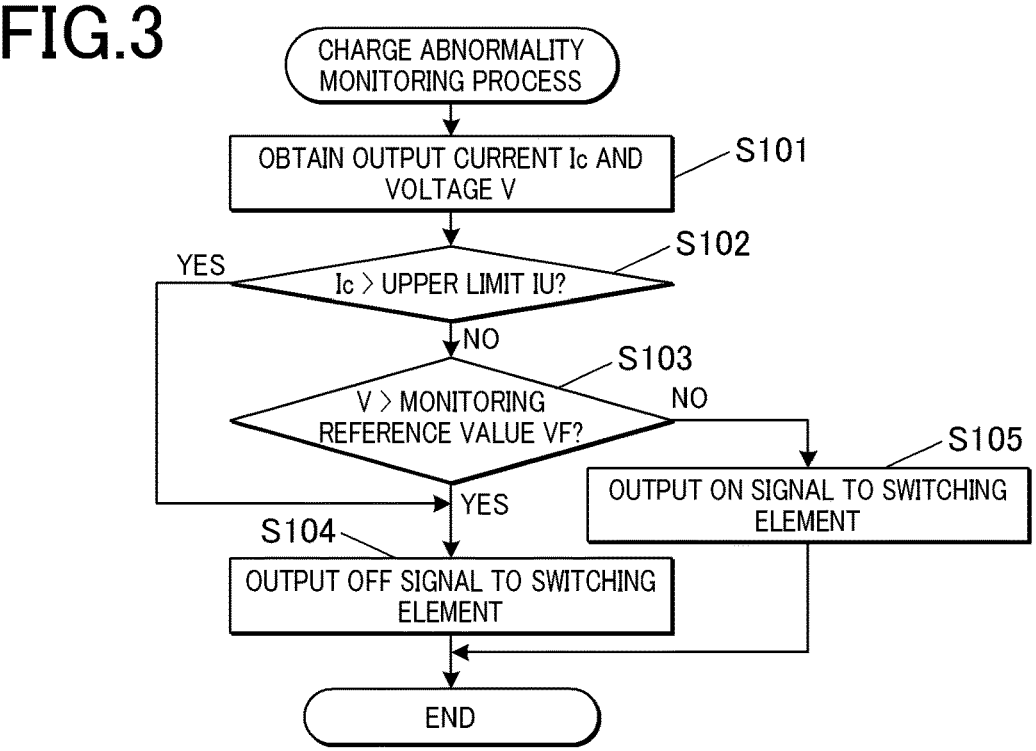
FIG. 3 is a flowchart illustrating the control steps of a charge abnormality monitoring process.

FIG. 3 is a flowchart illustrating the control steps of a charge abnormality monitoring process executed by the controller 14 in the charger 10. The charge abnormality monitoring process is started in synchronization with the monitoring intervals in the current & voltage detection circuit 13.

When a charge abnormality monitoring process is started, the controller 14 obtains the output current Ic and the storage voltage V from the current & voltage detection circuit 13 (step S101). The controller 14 determines whether the output current Ic is greater than the upper limit IU (step S102). If the output current Ic is greater than the upper limit IU ("YES" in step S102), the process of the controller 14 proceeds to step S104.

If the output current Ic is not greater than (equal to or less than) the upper limit IU ("NO" in step S102), the controller 14 determines whether the storage voltage V is greater than the monitoring reference value VF (step S103). If the output current Ic is greater ("YES" in step S103), the process of the controller 14 proceeds to step S104.

When the storage voltage V is not greater than (equal to or less than) the monitoring reference value VF ("NO" in step S103), the controller 14 outputs an ON signal to the switching element 12 to allow power supply (step S105). Then, the controller 14 ends the charge abnormality monitoring process.

When the process proceeds from step S102 or S103 to step S104, the controller 14 outputs an OFF signal to the switching element 12 to interrupt power supply (step S104). Then, the controller 14 ends the charge abnormality monitoring process.

Among these steps, the steps S102 and S103 correspond to the operations performed as a controller (determining step), and the step S104 corresponds to the operation performed as the controller of the present embodiment (switching step).

Figure 4:
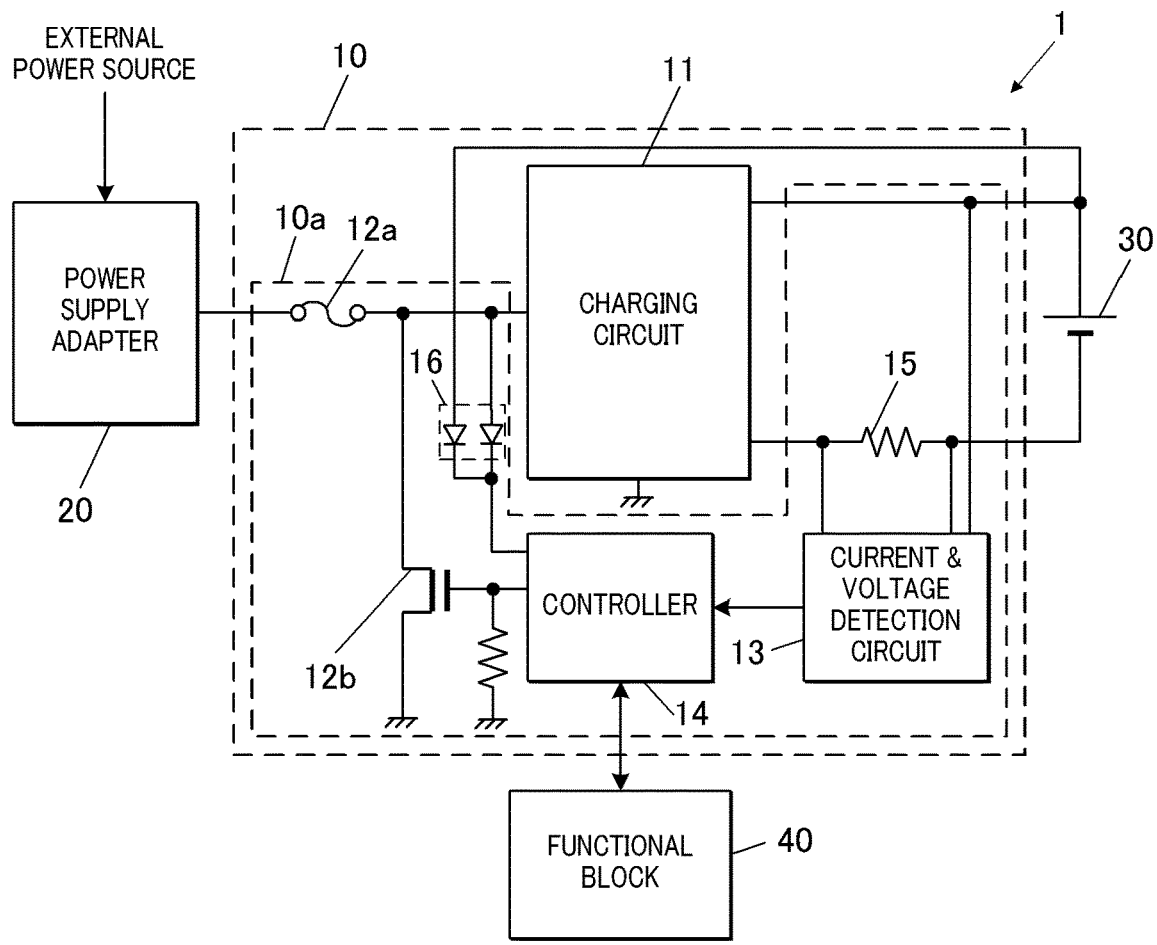
FIG. 4 is a block diagram illustrating the functional configuration of an electronic device according to Modification 1.

FIG. 4 is a block diagram illustrating the functional configuration of an electronic device 1 according to Modification 1.

In this electronic device 1, the charger 10 includes a fuse 12a and a switching element 12b as a switch in place of the switching element 12. The fuse 12a is disposed between the power supply adapter 20 and the charging circuit 11, and is cut when a current equal to or greater than a predetermined current value flows through it. The switching element 12b is located between the fuse 12a and the charging circuit 11, and between the fuse 12a and ground. The switching element 12b turns ON in response to a signal input from the controller 14, and forms a short-circuit path that passes through the fuse 12a from the power supply adapter 20.

Upon detecting an abnormality from the detection results of the current & voltage detection circuit 13, the controller 14 turns ON the switching element 12b. Thus, a short-circuit current that flows through a short-circuit path cuts the fuse 12a, so that power supply to the charging circuit 11 is interrupted. That is, once the charge protection circuit 10a interrupts power supply, the charge protection circuit 10a maintains the interrupting state. In this case, the charging circuit 11 and the fuse 12a may be replaced, or the entire charger 10 may be replaced, depending on cost and labor involved. Alternatively, the entire electronic device 1 may be replaced.

Figure 5:
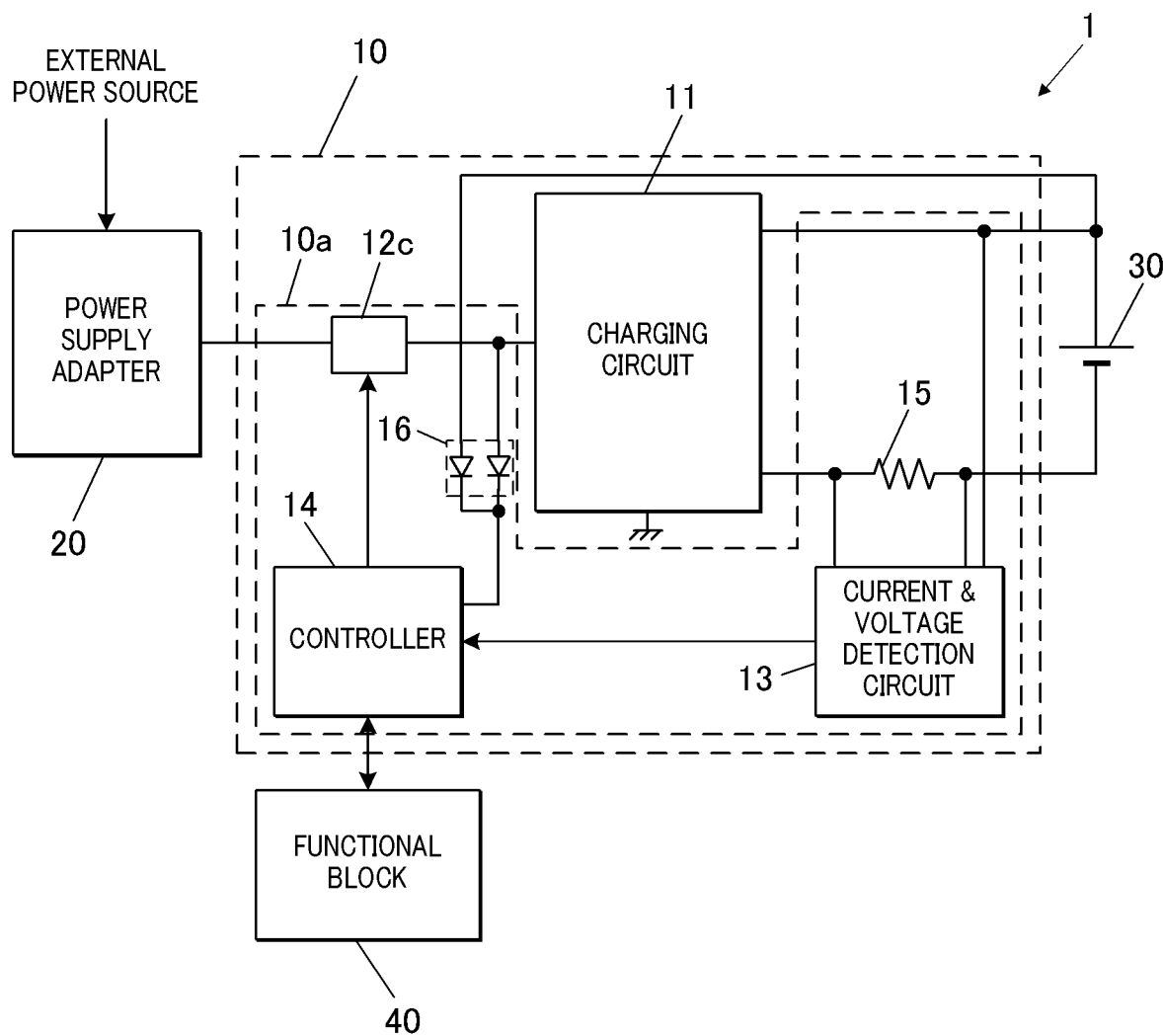
FIG. 5 is a block diagram illustrating the functional configuration of an electronic device according to Modification 2.

FIG. 5 is a block diagram illustrating the functional configuration of an electronic device 1 to according Modification 2.

This electronic device 1 is provided with a latching switch 12c, in place of the switching element 12 serving as the switch of the above embodiment. The method of latching is not specifically limited. Upon receiving, from the controller 14, a control signal for switching to the OFF state (interruption of power supply from the power supply adapter 20), the latching switch 12c switches to the OFF state and mechanically latches (maintains) the OFF state. The OFF state is canceled in response to a reset signal from the controller 14, or through a manual operation by the user. That is, even when the controller 14 determines that the detection result of the current & voltage detection circuit 13 is no longer abnormal, or even when the controller 14 stops operating and a signal from the controller 14 is lost, the latching switch 12*c* remains OFF and power supply is not restarted. However, the latching switch 12*c* itself is not broken. Therefore, the latching switch 12*c* may be useful when the failed charging circuit 11 in the charger 10 is replaceable.

As described above, the charge protection circuit 10*a* of the charger 10 provided in the electronic device 1 according to the present embodiment includes: the switching element 12 that switches between allowing and not allowing power supply from the external power source to the charging circuit 11 that supplies power for charging the rechargeable battery 30; the current & voltage detection circuit 13 that detects at least one of the current flowing from the charging circuit 11 to the rechargeable battery 30 and the voltage between two electrodes of the rechargeable battery 30; and the controller 14 that determines whether the detection result of the current& voltage detection circuit 13 is abnormal, and causes, as the controller, the switching element 12 to interrupt power supply to the charging circuit 11 when the detection result is abnormal.

With this configuration, when the output of the charging circuit 11 becomes abnormal, the abnormality is detected, so that power supply to the charging circuit 11 is interrupted. Therefore, it is possible to not only prevent overcharging of the rechargeable battery 30, but also quickly detect the abnormality of the charging circuit 11 itself and stop its operation. Accordingly, it is possible to reduce troubles due to overheating of the components such as the charger 10 and the rechargeable battery 30.

Further, the switching element 12 allows power supply when in a basic state. Therefore, at initial startup or every time the electronic device 1 and the charger 10 are started, normal charging and power supply can be quickly started without performing initial setup of the switching element 12.

Further, the controller 14 controls operations of the electronic device 1 provided with the charge protection circuit 10*a*. When the electronic device 1 is being started, the switching element 12 is in the basic state in which power supply is allowed. That is, normally, when the electronic device 1 is being started, power can be supplied from either the rechargeable battery 30 or the power supply adapter 20, and it is possible to freely switch between the two, based on the usage by the user. Therefore, as long as no abnormality occurs in the charger 10, the electronic device 1 can be used with no limitations, without especially making settings.

Further, with the provision of a pair of the fuse 12*a* and the switching element 12*b* of Modification 1, or with the provision of the latching switch 12*c* of Modification 2, the charge protection circuit 10*a* may be configured to, once it switches to an interrupting state in which power supply is interrupted, maintain the interrupting state. In this manner, it is possible to prevent power from being supplied again to the charging circuit 11 without making any repair after interruption of power supply.

Further, the charge protection circuit 10*a* of Modification 1 includes the fuse 12*a*, and interrupts power supply by cutting the fuse 12*a*. Thus, by physically disconnecting the fuse 12*a*, it is possible to more reliably interrupt power supply to the charging circuit 11. Especially, in the case of replacing the entire charger 10 or the entire electronic device 1 to eliminate the abnormality instead of making repairs, power supply is completely interrupted with the simple configuration described above. Therefore, it is possible to reliably prevent the charging circuit 11 from receiving power again and generating heat although not needed.

Further, in the charge protection circuit 10*a* of Modification 2, the latching switch 12*c* is used that is configured to, once it switches to the interrupting state in which power supply is interrupted, maintain the interrupting state. Thus, after power supply is interrupted, the latch that maintains the interrupting state can be reset. Therefore, it is possible to prevent power from being supplied before the charging circuit 11 is repaired or replaced, and use the charger 10 again after the serviceman makes repairs and reset the latch.

Further, the controller 14 causes the switching element 12 to switch between allowing and not allowing power supply in accordance with whether the detection result is abnormal. Thus, switching of the switching element 12 may be performed based simply on the current state. Thus, as soon as the charging circuit 11 is restored, power supply can be quickly restarted. Meanwhile, even if the charging circuit 11 remains abnormal, the switching element 12 immediately interrupts power supply again. Therefore, no problem occurs.

Further, the controller 14 controls operations of the electronic device 1 provided with the charge protection circuit 10*a*, and restricts at least one of operations other than switching control of the switching element 12 when causing the switching element 12 to interrupt power supply. After power supply from the external power source is interrupted, the electronic device 1 operates with the power remaining in the rechargeable battery 30. Accordingly, by restricting other operations, it is possible to make the controller 14, which controls operations of the switching element 12, operate for a longer time.

Further, the current & voltage detection circuit 13 detects the current flowing to the rechargeable battery 30, and the controller 14 causes the switching element 12 to interrupt power supply when the current detected by the current & voltage detection circuit 13 is greater than the upper limit IU of the current. Thus, by quickly interrupting power supply based on the current flowing to the rechargeable battery 30, it is possible to prevent heat generation due to a large current and to prevent overcharging and resultant troubles.

Further, the current & voltage detection circuit 13 detects a voltage between two electrodes of the rechargeable battery 30, and the controller 14 causes the switching element 12 to interrupt power supply when the voltage detected by the current & voltage detection circuit 13 is greater than the monitoring reference value VF.

If a large current flows due to a short circuit, a protection circuit may immediately operate to interrupt the current output. However, in this case, if current detection is performed at relatively long monitoring intervals, the large current might not be detected. Thus, by detecting the level of voltage that is lower than the voltage detected as an overvoltage and that is reached when a current output responsive to a large current is interrupted, occurrence of the large current can be detected through an excess voltage even while the large current is interrupted. Therefore, it is possible to more reliably respond to an abnormality of the charging circuit 11 and to interrupt power supply to the charging circuit 11.

Further, the controller 14 determines whether power is supplied from the external power source to the charging circuit 11, and variably sets, as the detection interval setter, a detection interval at which the current & voltage detection circuit 13 detects at least one of the current flowing from the charging circuit 11 to the rechargeable battery 30 and the voltage between two electrodes of the rechargeable battery 30.

The current & voltage detection circuit 13 may be used for not only detection of a charge abnormality, but also detection of the amount (remaining amount) of power stored in the rechargeable battery 30. By using the same element for different purposes, it is possible to prevent an increase in size and cost. In this case, appropriate monitoring intervals may be determined based on the differences in changes in current and voltage between charging and discharging. Thus, it is possible to prevent unneeded operations, and an increase in power consumption.

Further, the controller 14 sets, as the detection interval setter, the detection interval to a first detection interval when power is determined to be supplied from the external power source to the charging circuit 11, and sets the detection interval to a second detection interval longer than the first detection interval when power is determined not to be supplied from the external power source to the charging circuit 11. Unlike detection of a charge abnormality, since the voltage and current during normal consumption of power supplied from the rechargeable battery 30 do not change rapidly, detection during consumption of power (discharging) may be performed at monitoring intervals (first detection intervals) that are longer than monitoring intervals (second detection intervals) for detection of a charge abnormality. Accordingly, it is possible to effectively detect current and voltage at a required frequency in accordance with the purpose.

Further, the controller 14 sets, as the detection interval setter, the detection interval to the second detection interval when power supply to the charging circuit 11 is interrupted by the switching element 12. That is, in the case where charging is stopped due to a charge abnormality, the situation is treated in the same manner as during normal power consumption. Moreover, since the rechargeable battery 30 may need to last as long as possible without being recharged, power consumption can be reduced by changing the settings as described above to increase the monitoring interval.

Further, the charger 10 of the present embodiment includes: the charge protection circuit 10*a*; and the charging circuit 11 that receives power supplied from the external power source, and charges the rechargeable battery 30. In this configuration, the charge protection circuit 10*a* reliably detects an abnormality of the charging circuit 11 and interrupts power supply to the charging circuit 11. Therefore, it is possible to charge the rechargeable battery 30 more safely and promptly.

Further, the electronic device 1 of the present embodiment includes the charger 10 described above. Thus, it is possible to more reliably reduce troubles such as overheating of the electronic device 1, and operate the electronic device 1 using the rechargeable battery 30 safely.

Further, a charge protection method according to the present embodiment includes: a detecting step of detecting at least one of a current flowing from the charging circuit 11 to the rechargeable battery 30 and a voltage between two electrodes of the rechargeable battery 30, the charging circuit 11 supplying power for charging the rechargeable battery 30; a determining step of determining whether a detection result in the detecting step is abnormal; and a switching step of interrupting power supply to the charging circuit 11 when the detection result is determined to be abnormal. With this method, input to the charging circuit 11 is interrupted in response to an abnormal output of the charging circuit 11. Thus, it is possible to more reliably reduce troubles of the charger 10 and the rechargeable battery 30 due to the abnormality of the charging circuit 11.

The present invention is not limited to the embodiment described above, and various modifications may be made.

For example, in the above embodiment, both the output current from the charging circuit 11 to the rechargeable battery 30 and the applied voltage (storage voltage) to the rechargeable battery 30 are detected. However, it is not necessary to detect both the output current and the applied voltage. The current & voltage detection circuit 13 may be configured to detect only the current. In this case, the monitoring interval of the current may be shorter than that of the above embodiment. Alternatively, an analog circuit may be used to detect the maximum value in a period, and the detection result based on the maximum value may be output to the controller 14 at predetermined monitoring intervals. Further alternatively, only the voltage may be detected without directly detecting the current. In this case, the rising rate of the voltage may be taken into account.

Further, in the above embodiment, the switching element 12 is a normally-ON element. However, the switching element 12 may be a normally-OFF element, and switched ON under the control of the controller 14. In this case, although the controller 14 is started when power is supplied from the rechargeable battery 30 in the above embodiment, a circuit that can directly supply power from the power supply adapter 20 to the controller 14 may be provided.

Further, in the above embodiment, the monitoring reference value VF (reference voltage) is lower than the upper limit VU and the reference value VL of the overcharge prevention circuit (but is higher than the set voltage for normal charging at the substantially constant voltage). However, the monitoring reference value VF may be set to between the upper limit VU and the reference value VL. In this case, no abnormality is detected in the period from when the storage voltage falls below the monitoring reference value VF to when the storage voltage falls to the reference voltage VL and a large current flows again. Therefore, these values may be appropriately determined relatively to each other based on the monitoring interval and other factors so as to prevent an unnecessary delay in detection of an abnormality.

In the above embodiment, the controller 14 is implemented as software by the CPU. However, the present invention is not limited thereto. The controller 14 may be implemented as a hardware circuit that compares the voltage and the current to the monitoring reference value VF and the upper limit IU, respectively, and outputs signals based on the comparison results to the switching element 12.

The charge protection circuit 10*a* may be an independent circuit that can be externally attached to the charger 10.

The charger 10 does not have to be provided in the electronic device 1, and may be an independent charger.

Further, the specific details, such as the elements, and the arrangement and control operations of the elements, described in the above embodiments may be modified within the scope of the present invention.

Although some embodiments have been described, the present invention is not limited to the above embodiments, and the scope of the present invention is defined by the appended claims and their equivalents.

What is claimed is:

1. A charge protection circuit comprising:
   a switch configured to switch between allowing and not allowing power to be supplied from an external power source to a charging circuit that supplies power for charging a rechargeable battery;

a detector configured to detect a charged voltage V between two electrodes of the rechargeable battery at predetermined monitoring intervals; and
a controller configured to, at one of the predetermined monitoring intervals,
determine whether the charged voltage V detected by the detector is higher than a monitoring reference value VF; and
in response to determining that the charged voltage V detected by the detector is greater than the monitoring reference value VF at the one of the predetermined monitoring intervals, cause the switch to not allow the power supply to the charging circuit,
wherein the charging circuit comprises an overcharge prevention circuit configured to prevent the rechargeable battery from being charged over a predetermined upper limit VU,
wherein, at a time before the one of the predetermined monitoring intervals, while the switch allows the power supply to the charging circuit, the overcharge prevention circuit is configured to stop a current output from the charging circuit in response to the charged voltage V reaching the predetermined upper limit VU at the time before the one of the predetermined monitoring intervals, and resume the current output in response to the charged voltage V falling below a reference value VL, and
wherein the monitoring reference value VF is lower than the upper limit VU and lower than the reference value VL.

2. The charge protection circuit according to claim 1, wherein the switch is configured to allow the power supply when in a basic state.

3. The charge protection circuit according to claim 2, wherein the controller is configured to control operations of an electronic device provided with the charge protection circuit, and
wherein the basic state includes a state at the time when the electronic device is started.

4. The charge protection circuit according to claim 1, wherein once the switch switches to not allowing the power supply, the switch is configured to maintain an off position of not allowing the power supply.

5. The charge protection circuit according to claim 4, wherein the switch comprises a fuse and configured to interrupt the power supply by cutting the fuse.

6. The charge protection circuit according to claim 5, wherein the switch comprises a latching switch configured to maintain the off position once the switch switches to now allowing the power supply.

7. The charge protection circuit according to claim 1, wherein the controller is configured to cause the switch to switch between allowing and not allowing the power supply in accordance with whether the detection result is abnormal.

8. The charge protection circuit according to claim 2, wherein the controller is configured to cause the switch to switch between allowing and not allowing the power supply in accordance with whether the detection result is abnormal.

9. The charge protection circuit according to claim 3, wherein the controller is configured to cause the switch to switch between allowing and not allowing power the supply in accordance with whether the detection result is abnormal.

10. The charge protection circuit according to claim 7, wherein the controller is configured to:
control operations of an electronic device provided with the charge protection circuit; and
restrict at least one of operations other than switching control of the switch when causing the switch to interrupt the power supply.

11. The charge protection circuit according to claim 1, wherein the detector is configured to detect the current flowing from the charging circuit to the rechargeable battery at the predetermined monitoring intervals, and
wherein the controller is configured to:
determine that the detection result of the detector is abnormal when the current detected by the detector is greater than a reference current value; and
in response to determining that the detection result of the detector is abnormal, cause the switch to switch to not allowing the power supply.

12. The charge protection circuit according to claim 1, wherein the controller is configured to:
determine whether power is supplied from the external power source to the charging circuit; and
variably set sets the predetermined monitoring intervals in response to determining that power is supplied from the external power source to the charging circuit, and set the predetermined monitoring intervals to a constant value in response to determining that the power is not supplied from the external power source to the charging circuit.

13. The charge protection circuit according to claim 12, wherein the controller is configured to set the predetermined monitoring intervals to a first detection interval in response to determining that power is supplied from the external power source to the charging circuit, and set the predetermined monitoring intervals to a second detection interval longer than the first detection interval in response to determining that power is not supplied from the external power source to the charging circuit.

14. The charge protection circuit according to claim 13, wherein the controller is configured to set the predetermined monitoring intervals to the second detection interval in response to the switch switching to not allowing the power supply to the charging circuit.

15. A charger comprising:
the charge protection circuit of claim 1; and
the charging circuit configured to receive power from the external power source and charge the rechargeable battery.

16. An electronic device comprising: the charger of claim 15.

17. A charge protection method comprising:
switching between allowing and not allowing power supply to be supplied from an external power source to a charging circuit that supplies power for charging a rechargeable battery;
detecting a charged voltage V between two electrodes of the rechargeable battery at predetermined monitoring intervals; and
at one of the predetermined monitoring intervals,
determining the charged voltage V detected is higher than a monitoring reference value VF; and
in response to determining that the charged voltage V detected is higher than the monitoring reference value VF at the one of the predetermined monitoring intervals, switching to not allowing the power supply to the charging circuit, wherein the charging circuit comprises an overcharge prevention circuit configured to prevent the rechargeable battery from being charged over a predetermined upper limit VU, wherein, at a time before the one of the predetermined monitoring intervals, while the power supply to the charging circuit is allowed, the overcharge prevention circuit stops a current output from the charging circuit in response to the charged voltage V reaching the predetermined upper limit VU at the time before the one of the predetermined monitoring intervals, and resumes the current output in response to the charged voltage V falling below a reference value VL, and wherein the monitoring reference value VF is lower than the upper limit VU, and lower than the reference value VL.

\* \* \* \* \*